United States Patent
Lee et al.

(10) Patent No.: US 7,524,923 B1
(45) Date of Patent: Apr. 28, 2009

(54) SUZUKI POLYCONDENSATION FOR PREPARING ARYL POLYMERS FROM DIHALIDE MONOMERS

(75) Inventors: Sean Lee, Goleta, CA (US); Hailiang Wang, Camarillo, CA (US)

(73) Assignee: Dupont Displays, Inc., Santa Barbara, CA (US)

( * ) Notice: Subject to any disclaimer, the term of this patent is extended or adjusted under 35 U.S.C. 154(b) by 608 days.

(21) Appl. No.: 11/312,289

(22) Filed: Dec. 20, 2005
(Under 37 CFR 1.47)

Related U.S. Application Data

(60) Provisional application No. 60/694,398, filed on Jun. 27, 2005, provisional application No. 60/640,636, filed on Dec. 30, 2004.

(51) Int. Cl.
*C08G 79/08* (2006.01)
(52) U.S. Cl. .................. 528/394; 528/8; 528/397; 528/482; 528/488; 528/489; 252/301.16; 252/305.35
(58) Field of Classification Search .............. 528/394, 528/8, 397, 482, 488, 489; 252/301.16, 301.35
See application file for complete search history.

(56) References Cited

U.S. PATENT DOCUMENTS

| | | | |
|---|---|---|---|
| 5,645,948 A | 7/1997 | Shi et al. ............ | 428/690 |
| 5,753,757 A | 5/1998 | Hsieh ............ | 525/195 |
| 5,777,070 A | 7/1998 | Inbasekaran et al. ........ | 528/394 |
| 6,169,163 B1 | 1/2001 | Woo et al. ............ | 528/397 |
| 6,303,238 B1 | 10/2001 | Thompson et al. ........ | 428/690 |
| 6,353,072 B1 | 3/2002 | Towns et al. ............ | 528/4 |
| 6,362,310 B1 | 3/2002 | Woo et al. ............ | 528/397 |
| 6,512,083 B1 | 1/2003 | Woo et al. ............ | 528/397 |
| 6,514,632 B1 | 2/2003 | Woo et al. ............ | 428/690 |
| 6,541,602 B1 | 4/2003 | Spreitzer et al. ............ | 528/394 |
| 2001/0019782 A1 | 9/2001 | Igarashi et al. ............ | 428/690 |
| 2002/0013451 A1 | 1/2002 | Huang et al. ............ | 528/397 |
| 2002/0095017 A1 | 7/2002 | Towns et al. ............ | 528/4 |
| 2003/0039838 A1 | 2/2003 | Chen et al. ............ | 428/411.1 |
| 2003/0040595 A2 | 2/2003 | Towns et al. ............ | 528/4 |

FOREIGN PATENT DOCUMENTS

| | | |
|---|---|---|
| EP | 1 191 612 A2 | 3/2002 |
| EP | 1 191 614 A2 | 3/2002 |
| WO | WO 00/70655 | 11/2000 |
| WO | WO 01/41512 A1 | 6/2001 |
| WO | WO 02/02714 A2 | 1/2002 |
| WO | WO 02/15645 A1 | 2/2002 |

OTHER PUBLICATIONS

Gustaffson, G. et al., "Flexible Light-Emitting Diodes made from Soluble Conducting Polymer", *Nature*, 1992, 357, 477-479.
O'Brien, D.F. et al., "Electrophosphoresence from a Doped Polymer Light Emitting Diode", *Synthetic Metals*, 2001, 116(1-3), 379-383.

(Continued)

*Primary Examiner*—Duc Truong
(74) *Attorney, Agent, or Firm*—Woodcock Washburn LLP

(57) ABSTRACT

Methods for synthesizing aryl polymers, and uses for such polymers, are provided.

20 Claims, 1 Drawing Sheet

OTHER PUBLICATIONS

Campbell, I.H. et al., "Excitation Transfer Processes in a Phosphor-Doped Poly(*p*-phenylene vinylene) Light-Emitting Diode", *Physical Review B.*, 65, 085210-1-085210-8, 2002.

Wang, Y., 4$^{th}$ Edition, 1996, 18, 270-301, *Kirk Othmer Encyclopedia of Chemical Technology*.

Ishiyama, T. et al., "Palladium (0)-Catalyzed Cross-Coupling Reaction of Alkoxydiboron with Haloarenes: A Direct Procedure for Arylboronic Esters", *J. Org. Chem.*, 1995, 60, 7508-7510.

Yamamoto, T. et al., Preparation of π-Conjugated Poly(thiophene-2,5-diyal), P (p-phenylene), and Related Polymers Using Zerovalent Nickel Complexes. Linear Structure and Properties of the π-Conjugated Polymers, *Macromolecules*, 1992, 25, 1214-1223.

Ishiyama, T. et al., "Synthesis of Arylboranates *via* the Palladium (0)-Catalyzed Cross-Coupling Reaction of Tetra(alkoxo)dibrons with Aryl Triflates", *Tetrahedron Letters*, 1997, 38(19), 3447-3450.

Ritter, S.K. et al., "Widening the Road for C-C Bonds", *Chemical and Engineering News*, Feb. 4, 2002, 80(5), 26-27.

Franzèn, R., "The Suzuki, the Heck, and the Stille Reaction-Three Versatile Methods for the Introduction of New C-C Bonds on Solid Support", *Cancer J. Chem.*, 2000, 78, 957-962.

SUZUKI POLYCONDENSATION FOR PREPARING ARYL POLYMERS FROM DIHALIDE MONOMERS

CROSS REFERENCE

This application claims benefit to U.S. Provisional Application Ser. Nos. 60/640,636, filed Dec. 30, 2004 and 60/694,398, filed Jun. 27, 2005, the disclosures of which are each incorporated herein by reference in their entireties.

STATEMENT OF FEDERALLY SPONSORED RESEARCH

A portion of the research described herein was funded in part by the Defense Advanced Research Projects Agency (DARPA), Contract MDA972-00-C-005.

FIELD

This disclosure relates generally to methods of making aryl polymers, for example, those useful in organic electronic devices, and materials and methods for fabrication of the same.

BACKGROUND

Organic electronic devices convert electrical energy into radiation, detect signals through electronic processes, convert radiation into electrical energy, or include one or more organic semiconductor layers. Organic electronic devices contain photoactive materials, often aryl polymers. Methods for synthesizing such compounds are of great importance in the art.

Thus, what is needed are methods for synthesizing aryl polymers.

SUMMARY

Methods for synthesizing aryl polymers, and uses for such polymers, are provided.

The foregoing general description and the following detailed description are exemplary and explanatory only and are not restrictive of the invention, as defined in the appended claims.

BRIEF DESCRIPTION OF THE DRAWINGS

Embodiments are illustrated in the accompanying figures to improve understanding of concepts as presented herein.

Figure 1:
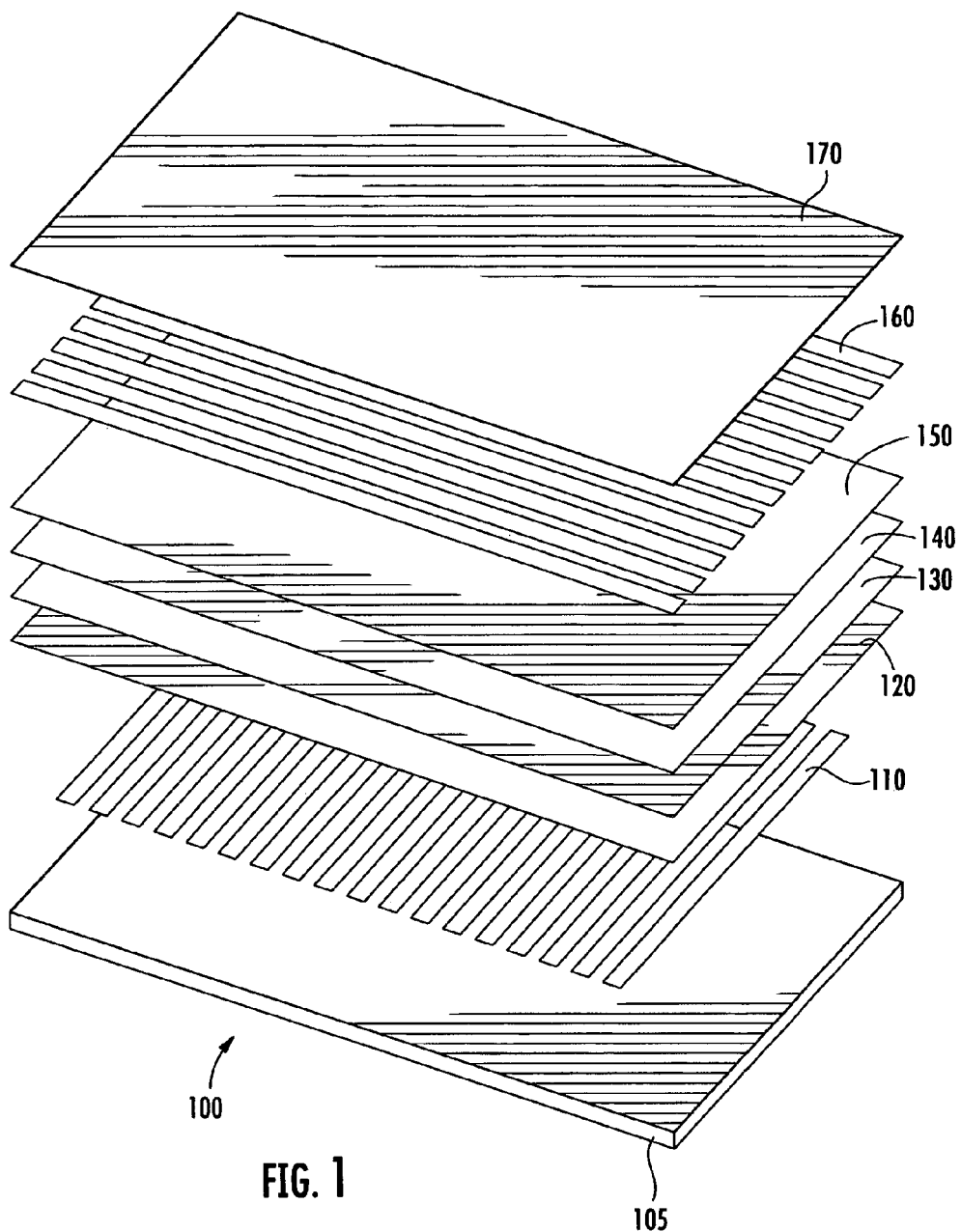
FIG. 1 is a schematic diagram of an organic electronic device.

The figures are provided by way of example and are not intended to limit the invention. Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

In one embodiment, a method of synthesizing an aryl polymer is provided, comprising reacting a first dihaloaryl moiety with a diboron ester in the presence of palladium to yield a first mixture; and, without substantially purifying the first mixture, reacting said first mixture with a second dihaloaryl moiety in the presence of a phase transfer agent.

The phrase "without substantially purifying the mixture" means a reaction mixture in which a further purification or isolation step has not occurred. For example, when a further reactant is added to a reaction mixture "without substantially purifying the mixture," the crude product of the reaction mixture is allowed to react with the further reactant.

In the Suzuki cross-coupling reaction, carbon atoms of a boronic acid and an aryl halide are coupled via palladium catalysis under basic conditions.

Formerly, the steps for forming a fluorene polymer from a dibromofluorene involved first synthesizing a fluorenediboronic acid from dibromofluorene using a Grignard reagent or an alkyl lithium reagent with trimethyl borate. The next step involved purifying the fluorenediboronic acid. The purification step was followed by polymerizing the acid with dibromofluorene in the presence of a phase transfer agent such as tetra-alkylammonium hydroxide or chloride. While such methods do enable the synthesis of polyfluorenes, they require the use of air and moisture sensitive reagents such as Grignard or alkyl lithium, which makes large scale reactions difficult as large amounts of these reagents are required. Moreover, the purification of the fluorenediboronic acid required to react with additional monomer to form the polymers is time consuming and can be costly. This also makes large scale production difficult and often cost prohibitive.

In one embodiment, a method of synthesizing an aryl polymer is provided, comprising forming an aryl diboronic ester by reacting a first dibromoaryl moiety with diboron ester in the presence of palladium; and reacting the aryl diboronic ester in situ with a second dibromoaryl moiety in the presence of a phase transfer agent. The term "in situ" when describing a chemical reaction is intended to mean a reaction taking place at the site where a reactant was synthesized without significant purification. Thus, the reaction between the aryl boronic ester and second dibromoaryl molecule occurs without purifying or isolating the intermediate product formed, i.e., the aryl diboronic esters. This in situ reaction scheme can confer significant benefits, including the saving of time and expense. In one embodiment, the diboron ester is a tetra(alkoxo)diboron molecule such as bis(catecholato)diboron or 4,4,5,5,4',4',5',5'-octamethyl-[2,2']bi[[1,3,2]dioxaborolanyl].

In one embodiment, a method of synthesizing an aryl polymer is provided, comprising reacting a first dibromoaryl moiety with a diboron ester in the presence of palladium to yield a first mixture; and, without substantially purifying the first mixture, reacting said first mixture with a second dibromoaryl moiety in the presence of a phase transfer agent.

"Phase transfer agent" includes any mild base that assists the palladium-catalyzed cross-coupling between two compounds, both having aryl moieties. The base may be CsF, $Cs_2CO_3$, tetra-alkylammonium hydroxide, tetra-alkylammonium chloride, or another mild base having similar basic strength and reactive characteristics. In one embodiment, the phase transfer agent is tetra-alkylammonium hydroxide or tetra-alkylammonium chloride.

In one embodiment, the second dibromoaryl moiety is different from the first dibromoaryl moiety.

In one embodiment, the aryl polymer comprises a random, block, alternating, or graft copolymer comprising units of aryl groups derived from the first dibromoaryl moiety and the second dibromoaryl moiety.

In one embodiment, the aryl polymer is a polyfluorene.

In one embodiment, at least one of the dibromoaryl moieties is a dibromofluorene. In one embodiment, the dibromofluorene can be substituted.

In one embodiment, the dibromofluorene is a compound having the formula (I):

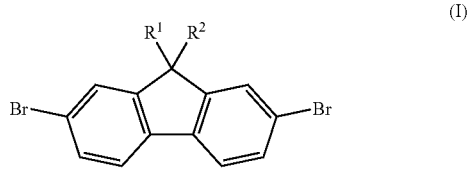

(I)

wherein:

$R^1$ and $R^2$ are, independently, H, alkyl, alkenyl, alkynyl, alkoxy, aryl, heteroalkyl, heteroaryl, —CN, —$OR^3$, —$CO_2R^3$, —$SR^3$, —$N(R^3)_2$, —$P(R^3)_2$, —$SOR^3$, —$SO_2R^3$, or —$NO_2$, or $R^1$ and $R^2$, together, form a 5- or 6-membered cycloalkyl, heterocycloalkyl, aryl, or heteroaryl ring; and $R^3$ is alkyl or aryl.

In one embodiment, at least one of $R^1$ or $R^2$ is further substituted with a halogen or is partially unsaturated. In one embodiment, at least one of $R^1$ or $R^2$ is fluorinated alkyl, fluorinated alkenyl, fluorinated oxyalkyl, fluorinated oxyalkenyl, fluorinated oxyalkynyl, or partially unsaturated heteroalkyl.

One of skill in the art will appreciate that certain substitutions are preferred due to their lack of reactivity as the substituted dibromofluorene undergoes Suzuki coupling; thereby, reducing the formation of unwanted side reactions.

In one embodiment, the dibromofluorene is 2,7-dibromo-9,9-bis-(2-ethyl-hexyl)-9H-fluorene, 2,7-dibromo-9,9-dioctyl-9H-fluorene, 2,7-dibromo-9,9-bis [2-[2-(2-methoxyethoxy)ethoxy]ethyl]-fluorene, 2,7-dibromo-9,9-bis-(6-bromohexyl)fluorene, 2,7-dibromo-9,9-bis[6-(N,N-dimethylamino)hexyl]fluorene, 2,7-dibromo-9,9-bis(4-cyanobiphenyl-4'-oxyhexyl)fluorene, 2,7-dibromo-9,9-bis (4-sulfonylbutoxyphenyl)fluorene, or 2,7-dibromo-9,9-bis (4-hydroxyphenyl)fluorene.

In one embodiment, the dibromofluorene is 2,7-dibromo-9,9-bis-(2-ethyl-hexyl)-9H-fluorene.

In one embodiment, both of the dibromoaryl moieties are a dibromofluorene.

In one embodiment, both of the dibromoaryl moieties are the same. In one embodiment, the dibromoaryl moieties are different.

In one embodiment, the dibromofluorene moieties are each independently 2,7-dibromo-9,9-bis-(2-ethyl-hexyl)-9H-fluorene, 2,7-dibromo-9,9-dioctyl-9H-fluorene, 2,7-dibromo-9,9-bis [2-[2-(2-methoxyethoxy)ethoxy]ethyl]-fluorene, 2,7-dibromo-9,9-bis-(6-bromohexyl)fluorene, 2,7-dibromo-9,9-bis[6-(N,N-dimethylamino)hexyl]fluorene, 2,7-dibromo-9,9-bis(4-cyanobiphenyl-4'-oxyhexyl)fluorene, 2,7-dibromo-9,9-bis(4-sulfonylbutoxyphenyl)fluorene, or 2,7-dibromo-9,9-bis(4-hydroxyphenyl)fluorene. Yamamoto, T., et al., *Macromolecules* 1992, 25, 1214, describes a number dibromofluorene molecules used to form polyfluorenes using nickel-mediated catalyzation. These dibromofluorene molecules can be used to form polyfluorenes using the methods presented herein. Preferably, the dibromofluorene is 2,7-dibromo-9,9-bis-(2-ethyl-hexyl)-9H-fluorene.

In one embodiment, compositions are provided comprising the above-described compounds and at least one solvent, processing aid, charge transporting material, or charge blocking material. These compositions can be in any form, including, but not limited to solvents, emulsions, and colloidal dispersions.

Device

Referring to FIG. 1, an exemplary organic electronic device 100 is shown. The device 100 includes a substrate 105. The substrate 105 may be rigid or flexible, for example, glass, ceramic, metal, or plastic. When voltage is applied, emitted light is visible through the substrate 105.

A first electrical contact layer 110 is deposited on the substrate 105. For illustrative purposes, the layer 110 is an anode layer. Anode layers may be deposited as lines. The anode can be made of, for example, materials containing or comprising metal, mixed metals, alloy, metal oxides or mixed-metal oxide. The anode may comprise a conducting polymer, polymer blend or polymer mixtures. Suitable metals include the Group 11 metals, the metals in Groups 4, 5, and 6, and the Group 8, 10 transition metals. If the anode is to be light-transmitting, mixed-metal oxides of Groups 12, 13 and 14 metals, such as indium-tin-oxide, are generally used. The anode may also comprise an organic material, especially a conducting polymer such as polyaniline, including exemplary materials as described in *Flexible Light-Emitting Diodes Made From Soluble Conducting Polymer*, Nature 1992, 357, 477-479. At least one of the anode and cathode should be at least partially transparent to allow the generated light to be observed.

An optional buffer layer 120, such as hole transport materials, may be deposited over the anode layer 110, the latter being sometimes referred to as the "hole-injecting contact layer." Examples of hole transport materials suitable for use as the layer 120 have been summarized, for example, in Kirk Othmer, Encyclopedia of Chemical Technology, Vol. 18, 837-860 (4th ed. 1996). Both hole transporting "small" molecules as well as oligomers and polymers may be used. Hole transporting molecules include, but are not limited to: N,N' diphenyl-N,N'-bis(3-methylphenyl)-[1,1'-biphenyl]-4,4'-diamine (TPD), 1,1bis[(di-4-tolylamino) phenyl]cyclohexane (TAPC), N,N' bis(4-methylphenyl)-N,N'-bis(4-ethylphenyl)-[1,1'-(3,3'-dimethyl)biphenyl]-4,4'-d iamine (ETPD), tetrakis (3-methylphenyl)-N,N,N',N'-2,5-phenylenediamine (PDA), a-phenyl 4-N,N-diphenylaminostyrene (TPS), p (diethylamino)benzaldehyde diphenylhydrazone (DEH), triphenylamine (TPA), bis[4 (N,N-diethylamino)-2-methylphenyl](4-methylphenyl)methane (MPMP), 1 phenyl-3-[p-(diethylamino)styryl]-5-[p-(diethylamino)phenyl] pyrazoline (PPR or DEASP), 1,2 trans-bis(9H-carbazol-9-yl) cyclobutane (DCZB), N,N,N', N' tetrakis(4-methylphenyl)-

(1,1'-biphenyl)-4,4'-diamine (TTB), and porphyrinic compounds, such as copper phthalocyanine. Useful hole transporting polymers include, but are not limited to, polyvinylcarbazole, (phenylmethyl)polysilane, and polyaniline. Conducting polymers are useful as a class. It is also possible to obtain hole transporting polymers by doping hole transporting moieties, such as those mentioned above, into polymers such as polystyrenes and polycarbonates.

An organic layer 130 may be deposited over the buffer layer 120 when present, or over the first electrical contact layer 110. In some embodiments, the organic layer 130 may be a number of discrete layers comprising a variety of components. Depending upon the application of the device, the organic layer 130 can be a light-emitting layer that is activated by an applied voltage (such as in a light-emitting diode or light-emitting electrochemical cell), or a layer of material that responds to radiant energy and generates a signal with or without an applied bias voltage (such as in a photodetector).

Other layers in the device can be made of any materials which are known to be useful in such layers upon consideration of the function to be served by such layers.

Any organic electroluminescent ("EL") material can be used as a photoactive material (e.g., in layer 130). Such materials include, but are not limited to, fluorescent dyes, small molecule organic fluorescent compounds, fluorescent and phosphorescent metal complexes, conjugated polymers, and mixtures thereof. Examples of fluorescent dyes include, but are not limited to, pyrene, perylene, rubrene, derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of Iridium with phenylpyridine, phenylquinoline, or phenylpyrimidine ligands as disclosed in Petrov et al., Published PCT Application WO 02/02714, and organometallic complexes described in, for example, published applications US 2001/0019782, EP 1191612, WO 02/15645, and EP 1191614; and mixtures thereof. Electroluminescent emissive layers comprising a charge carrying host material and a metal complex have been described by Thompson et al., in U.S. Pat. No. 6,303,238, and by Burrows and Thompson in published PCT applications WO 00/70655 and WO 01/41512. Examples of conjugated polymers include, but are not limited to poly(phenylenevinylenes), polyfluorenes, poly(spirobifluorenes), polythiophenes, poly(p-phenylenes), copolymers thereof, and mixtures thereof.

In one embodiment of the devices of the invention, photoactive material can be an organometallic complex. In another embodiment, the photoactive material is a cyclometalated complex of iridium or platinum. Other useful photoactive materials may be employed as well. Complexes of iridium with phenylpyridine, phenylquinoline, or phenylpyrimidine ligands have been disclosed as electroluminescent compounds in Petrov et al., Published PCT Application WO 02/02714. Other organometallic complexes have been described in, for example, published applications US 2001/0019782, EP 1191612, WO 02/15645, and EP 1191614. Electroluminescent devices with an active layer of polyvinyl carbazole (PVK) doped with metallic complexes of iridium have been described by Burrows and Thompson in published PCT applications WO 00/70655 and WO 01/41512. Electroluminescent emissive layers comprising a charge carrying host material and a phosphorescent platinum complex have been described by Thompson et al., in U.S. Pat. No. 6,303,238, Bradley et al., in Synth. Met. 2001, 116 (1-3), 379-383, and Campbell et al., in Phys. Rev. B, Vol. 65 085210.

A second electrical contact layer 160 is deposited on the organic layer 130. For illustrative purposes, the layer 160 is a cathode layer.

Cathode layers may be deposited as lines or as a film. The cathode can be any metal or nonmetal having a lower work function than the anode. Exemplary materials for the cathode can include alkali metals, especially lithium, the Group 2 (alkaline earth) metals, the Group 12 metals, including the rare earth elements and lanthanides, and the actinides. Materials such as aluminum, indium, calcium, barium, samarium and magnesium, as well as combinations, can be used. Lithium-containing and other compounds, such as LiF and $Li_2O$, may also be deposited between an organic layer and the cathode layer to lower the operating voltage of the system.

An electron transport layer 140 or electron injection layer 150 is optionally disposed adjacent to the cathode, the cathode being sometimes referred to as the "electron-injecting contact layer."

An encapsulation layer 170 is deposited over the contact layer 160 to prevent entry of undesirable components, such as water and oxygen, into the device 100. Such components can have a deleterious effect on the organic layer 130. In one embodiment, the encapsulation layer 170 is a barrier layer or film.

Though not depicted, it is understood that the device 100 may comprise additional layers. For example, there can be a layer (not shown) between the anode 110 and hole transport layer 120 to facilitate positive charge transport and/or band-gap matching of the layers, or to function as a protective layer. Other layers that are known in the art or otherwise may be used. In addition, any of the above-described layers may comprise two or more sub-layers or may form a laminar structure. Alternatively, some or all of anode layer 110 the hole transport layer 120, the electron transport layers 140 and 150, cathode layer 160, and other layers may be treated, especially surface treated, to increase charge carrier transport efficiency or other physical properties of the devices. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

In one embodiment, the different layers have the following range of thicknesses: anode 110, 500-5000 Å, in one embodiment 1000-2000 Å; hole transport layer 120, 50-2000 Å, in one embodiment 200-1000 Å; photoactive layer 130, 10-2000 Å, in one embodiment 100-1000 Å; layers 140 and 150, 50-2000 Å, in one embodiment 100-1000 Å; cathode 160, 200-10000 Å, in one embodiment 300-5000 Å. The location of the electron-hole recombination zone in the device, and thus the emission spectrum of the device, can be affected by the relative thickness of each layer. Thus the thickness of the electron-transport layer should be chosen so that the electron-hole recombination zone is in the light-emitting layer. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

Devices can be prepared employing a variety of techniques. These include, by way of non-limiting exemplification, vapor deposition techniques and liquid deposition. Devices may also be sub-assembled into separate articles of manufacture that can then be combined to form the device.

Methods

The process according to the present disclosure is generally carried out as shown in the following schemes:

Scheme 1

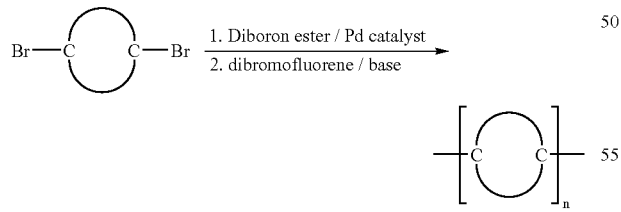

The palladium-catalyzed cross-coupling reaction of diboron ester with a dibromo-aryl monomer gives a direct procedure for diboronic ester monomer.

Without isolating the diboronic ester, the reaction processes Suzuki polycondensation by adding one more equivalents of dibromo-aryl monomer to the crude diboronic ester mixture along with a phase transfer agent to yield an aryl polymer.

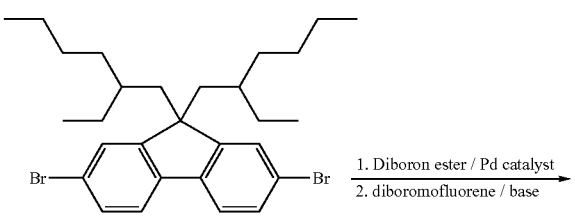

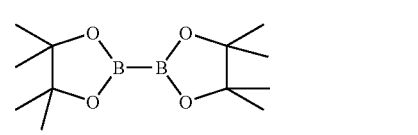

Some embodiments provide procedures for synthesizing polyfluorenes. See Scheme II, below. These processes start with palladium-catalyzed cross coupling of two equivalents of a diboron ester (i) with dibromofluorene to give a direct procedure for fluorenediboronic ester (ii).

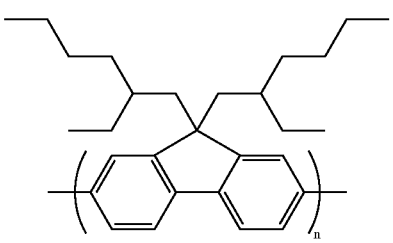

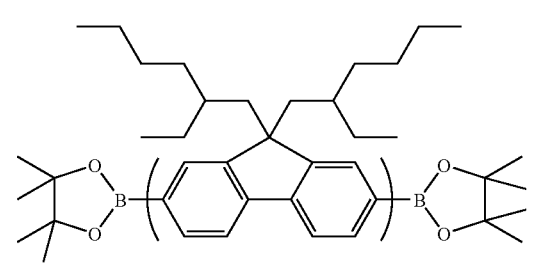

Without isolating fluorenediboronic ester, the reaction undergoes Suzuki polycondensation by the addition of one equivalent of dibromofluorene and a phase transfer agent into the reaction mixture to yield a polyfluorene.

Scheme II

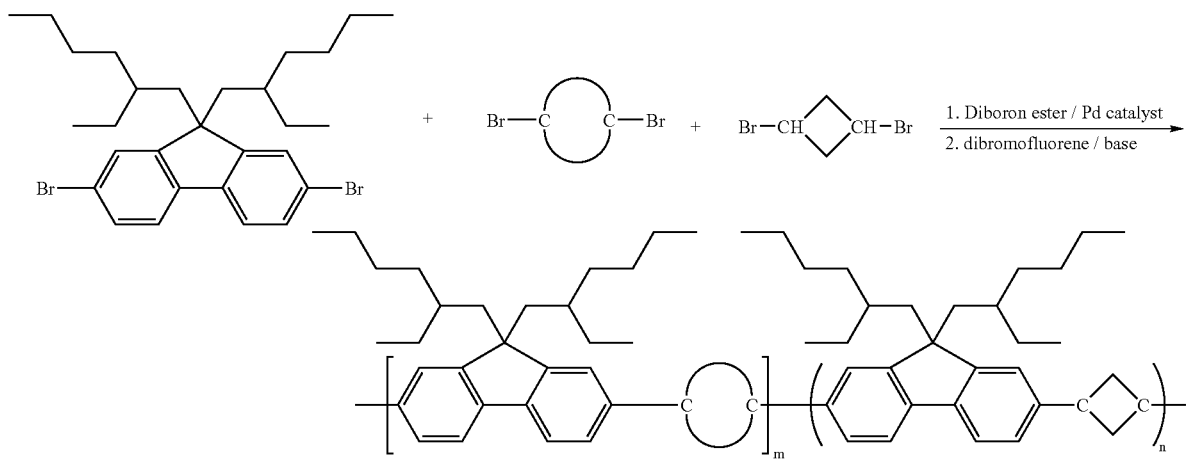

Other hetero-aryl polymers can be formed by the inventive processes by variation of dibromo-aryl monomers.

In another embodiment, the palladium-catalyzed cross-coupling reaction of one equivalent of diboron ester with dibromofluorene gives a direct product of fluorene-monoboronic ester (iii).

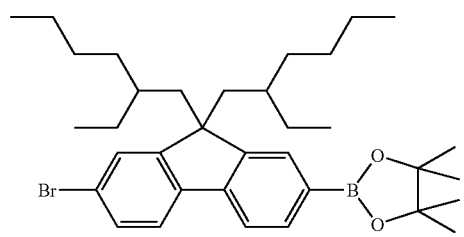

Without isolating the fluorene-monoboronic ester, the reaction undergoes Suzuki polycondensation by adding a phase transfer agent into the reaction mixture to yield a polyfluorene.

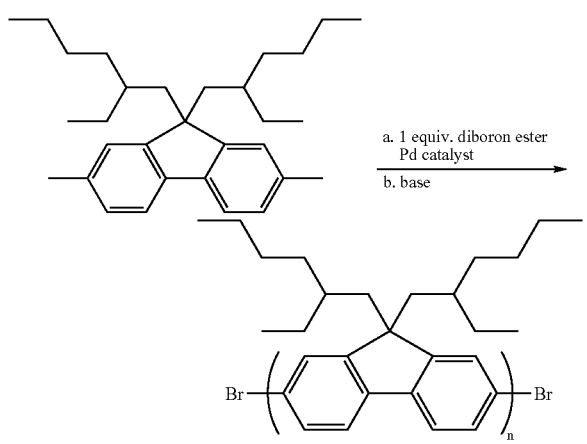

Some embodiments can provide for reduced handling of air and moisture sensitive reagents, such as a Grignard reagent or alkyl lithium reagent. Concerns over such handling of sensitive reagents is heightened during large scale productions and any reduction in the need to handle such reagents is desirable.

The disclosed inventive processes provide mild conditions for the preparation of a diboronic ester; therefore, the dibromo-aryl monomer may bear various functional groups, such as ester, carbonyl, cyano and nitro groups. By allowing for the addition of such functional groups, various aryl polymers carrying different functional groups for different purposes are possible.

DEFINITIONS

As used herein, the term "alkyl" includes both branched and straight-chain saturated aliphatic hydrocarbon groups having the specified number of carbon atoms. The term is also intended to include cyclic groups. Examples of alkyl groups include methyl, ethyl, propyl, isopropyl, isobutyl, isobutyl, tertbutyl, pentyl, isopentyl, hexyl, cyclohexyl, isohexyl and the like. The term "alkyl" implicitly includes both substituted and unsubstituted hydrocarbon groups. In some embodiments, the alkyl group may be mono-, di- and tri-substituted. An example of a substituted alkyl group is trifluoromethyl. Other substituted alkyl groups are formed from one or more of the substituents described herein. In other embodiments, alkyl groups have 1 to 12 carbon atoms. While in further embodiments, the alkyl groups have 1 to 6 carbon atoms.

The term "aryl" or "aryl moiety" means an aromatic carbocyclic moiety of up to 20 carbon atoms, which may be a single ring (monocyclic) or multiple rings (bicyclic, up to three rings) fused together or linked covalently. Any suitable ring position of the aryl moiety may be covalently linked to the defined chemical structure. Examples of aryl moieties include, but are not limited to, chemical groups such as phenyl, 1-naphthyl, 2-naphthyl, dihydronaphthyl, tetrahydronaphthyl, biphenyl, anthryl, phenanthryl, fluorenyl, indanyl, biphenylenyl, acenaphthenyl, acenaphthylenyl, and the like. In some embodiments, aryl groups have 6 to 20 carbon atoms.

The term "haloaryl" means an "aryl" further substituted with a halogen. A subset of an haloaryl or arylhalide is a "dibromoaryl," which means an aryl group having at least two bromo substituents.

The term "boronic acid" means a —B(OH)$_2$ moiety. Examples of an arylboronic acid include phenylboronic acid, 3,5-bis-trifluoromethyl-phenylboronic acid, 2-benzofuranboronic acid, 4-trimethylsilyl-butylphenylboronic acid, phenylboronic acid, 4-tert-butylphenylboronic acid, or 2-6-dimethoxypheylboronic acid. A subset of an arylboronic acid is an "aryl diboronic ester," which means an aryl group having at least two —B(OH)$_2$ moieties.

The term "diboron ester" means a tetra(alkoxo)diboron such as bis(catecholato)diboron, which is shown in Scheme II, below, as compound (I). The term "diboronic ester" means an aryl group having a di-substitution of tetra(alkoxo)boron, such as catecholatoboron, that will allow for polymerization according to the inventive process. An example of a diboronic ester is a polyfluorenediboronic ester, whose structure can be seen in Scheme II, below, as compound (II). The diboronic ester can be further substituted provided that the ability to polymerize is not significantly reduced.

The term "heteroaryl," as used herein, refers to a 5 to 10 membered monocyclic or bicyclic carbon containing aromatic ring having 1 to 3 of its ring members independently selected from nitrogen, sulfur or oxygen. In some embodiments, monocyclic rings have 5 to 6 members. In certain embodiments, bicyclic rings have 8 to 10 membered ring structures. The heteroaryl group may be unsubstituted or substituted. Examples of heteroaryls include, but are not limited to, thienyl, furyl, pyrrolyl, imidazolyl, pyrazolyl, oxazolyl, isoxazolyl, thiazolyl, isothiazolyl, pyridyl, pyrazinyl, pyrimidinyl, pyridazinyl, indolyl, indazolyl, benzofuranyl, isobenzofuranyl, benzothienyl, isobenzothienyl, quinolyl, isoquinolyl, quinoxalinyl, and quinazolinyl.

The use of "a" or "an" are employed to describe elements and components of the invention. This is done merely for convenience and to give a general sense of the invention. This description should be read to include one or at least one and the singular also includes the plural unless it is obvious that it is meant otherwise.

The term "active" when referring to a layer or material is intended to mean a layer or material that exhibits electronic or electro-radiative properties. An active layer material may emit radiation or exhibit a change in concentration of electron-hole pairs when receiving radiation. Thus, the term "active material" refers to a material which electronically facilitates the operation of the device. Examples of active materials include, but are not limited to, materials which conduct, inject, transport, or block a charge, where the charge can be either an electron or a hole. Examples of inactive materials include, but are not limited to, planarization materials, insulating materials, and environmental barrier materials.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "layer" is used interchangeably with the term "film" and refers to a coating covering a desired area. The area can be as large as an entire device or a specific functional area such as the actual visual display, or as small as a single sub-pixel. Films can be formed by any conventional deposition technique, including vapor deposition and liquid deposition. Liquid deposition techniques include, but are not limited to, continuous deposition techniques such as spin coating, gravure coating, curtain coating, dip coating, slot-die coating, spray-coating, and continuous nozzle coating; and discontinuous deposition techniques such as ink jet printing, gravure printing, and screen printing.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode). The term device also includes coating materials for memory storage devices, antistatic films, biosensors, electrochromic devices, solid electrolyte capacitors, energy storage devices such as a rechargeable battery, and electromagnetic shielding applications.

The term "palladium" or "palladium compound" refers to a palladium atom or a compound or complex having a palladium atom therein. Examples of a palladium compound include $PdCl_2(dppf)$, $Pd(PPh_3)_4$, $Pd(OAc)_2$, and $Pd_2dba_3$ (tris(dibenzylidene acetone)dipalladium).

The term "substrate" is intended to mean a workpiece that can be either rigid or flexible and may include one or more layers of one or more materials, which can include, but are not limited to, glass, polymer, metal, or ceramic materials, or combinations thereof.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic, and semiconductive member arts.

While the utility of the improved Suzuki reactions featured herein has been extensively demonstrated by reference to electrochemistry, the broad applicability of the reaction for the creation of molecules of interest in other fields is to be appreciated. In particular, Suzuki reactions are widely employed in the fields of pharmaceuticals, agricultural chemistry and organic chemistry generally.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Many aspects and embodiments have been described above and are merely exemplary and not limiting. After reading this specification, skilled artisans appreciate that other aspects and embodiments are possible without departing from the scope of the invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

The invention claimed is:

1. A method of synthesizing an aryl polymer, comprising:
   reacting a first dibromoaryl moiety with a diboron ester in the presence of palladium to yield a first mixture; and
   without substantially purifying the first mixture, reacting said first mixture with a second dibromoaryl moiety in the presence of a phase transfer agent.

2. The method of claim 1, wherein the second dibromoaryl moiety is different from the first dibromoaryl moiety.

3. The method of claim 2, wherein the aryl polymer comprises a random, block, alternating, or graft copolymer comprising units of aryl groups derived from the first dibromoaryl moiety and the second dibromoaryl moiety.

4. The method of claim 1, wherein the phase transfer agent is tetra-alkylammonium hydroxide or tetra-alkylammonium chloride.

5. The method of claim 1, wherein the diboron ester is bis(catecholato)diboron or 4,4,5,5,4',4',5',5'-octamethyl-[2,2']bi[[1,3,2]dioxaborolanyl].

6. The method of claim 1, wherein the aryl polymer is a polyfluorene.

7. The method of claim 1, wherein at least one of the dibromoaryl moieties is a dibromofluorene.

8. The method of claim 7, wherein the dibromofluorene is a compound having the formula (I):

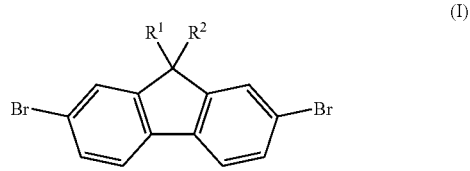

(I)

wherein:
$R^1$ and $R^2$ are, independently, H, alkyl, alkenyl, alkynyl, alkoxy, aryl, heteroalkyl, heteroaryl, —CN, —OR$^3$, —CO$_2$R$^3$, —SR$^3$, —N(R$^3$)$_2$, —P(R$^3$)$_2$, —SOR$^3$, —SO$_2$R$^3$, or —NO$_2$, or $R^1$ and $R^2$, together, form a 5- or 6-membered cycloalkyl, heterocycloalkyl, aryl, or heteroaryl ring; and
$R^3$ is alkyl or aryl.

9. The method of claim 8, wherein at least one of $R^1$ or $R^2$ is further substituted with a halogen or is partially unsaturated.

10. The method of claim 8, wherein at least one of $R^1$ or $R^2$ is fluorinated alkyl, fluorinated alkenyl, fluorinated oxyalkyl, fluorinated oxyalkenyl, fluorinated oxyalkynyl, or partially unsaturated heteroalkyl.

11. The method of claim 7, wherein the dibromofluorene is 2,7-dibromo-9,9-bis-(2-ethyl-hexyl)-9H-fluorene, 2,7-d ibromo-9,9-dioctyl-9H-fluorene, 2,7-d ibromo-9,9-bis [2-[2-(2-methoxyethoxy)ethoxy]ethyl]-fluorene, 2,7-dibromo-9,9-bis-(6-bromohexyl)fluorene, 2,7-dibromo-9,9-bis[6-(N,N-dimethylamino)hexyl]fluorene, 2,7-dibromo-9,9-bis(4-cyanobiphenyl-4'-oxyhexyl)fluorene, 2,7-dibromo-9,9-bis (4-sulfonylbutoxyphenyl)fluorene, or 2,7-dibromo-9,9-bis (4-hydroxyphenyl)fluorene.

12. The method of claim 7, wherein the dibromofluorene is 2,7-dibromo-9,9-bis-(2-ethyl-hexyl)-9H-fluorene.

13. The method of claim 1, wherein both of the dibromoaryl moieties are a dibromofluorene.

14. The method of claim 13, wherein both of the dibromoaryl moieties are the same.

15. The method of claim 13, wherein the dibromofluorene moieties are each independently 2,7-d ibromo-9,9-bis-(2-ethyl-hexyl)-9H-fluorene, 2,7-dibromo-9,9-d ioctyl-9H-fluorene, 2,7-dibromo-9,9-bis [2-[2-(2-methoxyethoxy) ethoxy]ethyl]-fluorene, 2,7-dibromo-9,9-bis-(6-bromohexyl)fluorene, 2,7-dibromo-9,9-bis[6-(N,N-dimethylamino)hexyl]fluorene, 2,7-dibromo-9,9-bis(4-cyanobiphenyl-4'-oxyhexyl)fluorene, 2,7-dibromo-9,9-bis (4-sulfonylbutoxyphenyl)fluorene, or 2,7-dibromo-9,9-bis (4-hydroxyphenyl)fluorene.

16. A method of synthesizing an aryl polymer, comprising:
   reacting a first dihaloaryl moiety with a diboron ester in the presence of palladium to yield a first mixture; and
   without substantially purifying the first mixture, reacting said first mixture with a second dihaloaryl moiety in the presence of a phase transfer agent.

17. A method of synthesizing an aryl polymer, comprising:
   forming an aryl diboronic ester by reacting a first dibromoaryl moiety with diboron ester in the presence of palladium; and
   reacting the aryl diboronic ester in situ with a second dibromoaryl moiety in the presence of a phase transfer agent.

18. A composition including an aryl polymer formed by the method of claim 1.

19. An organic electronic device having an active layer including an aryl polymer formed by the method of claim 1.

20. An article useful in the manufacture of an organic electronic device, comprising an aryl polymer formed by the method of claim 1.

* * * * *